(12) United States Patent
Yen

(10) Patent No.: US 8,087,089 B2
(45) Date of Patent: Dec. 27, 2011

(54) SYSTEM FOR A DIGITAL CONTENT DISTRIBUTING SERVICE AND THE METHOD THEREOF

(76) Inventor: Chih Hsiung Yen, Taipei (TW)

( * ) Notice: Subject to any disclaimer, the term of this patent is extended or adjusted under 35 U.S.C. 154(b) by 186 days.

(21) Appl. No.: 11/882,960

(22) Filed: Aug. 8, 2007

(65) Prior Publication Data
US 2010/0251384 A1  Sep. 30, 2010

(51) Int. Cl.
*G06F 7/04* (2006.01)
(52) U.S. Cl. ........................................ 726/27
(58) Field of Classification Search .............. 726/27
See application file for complete search history.

(56) References Cited

U.S. PATENT DOCUMENTS

| | | | |
|---|---|---|---|
| 7,590,820 B2 * | 9/2009 | Dong et al. ............... | 711/209 |
| 2002/0124258 A1 * | 9/2002 | Fritsch ...................... | 725/88 |

* cited by examiner

*Primary Examiner* — Jacob Lipman
(74) *Attorney, Agent, or Firm* — Muncy, Geissler, Olds & Lowe, PLLC

(57) ABSTRACT

A method and system for a digital content distributing service, wherein the system comprises a central broadcast station, an audit trails unit, and a distributing control unit. The central broadcasting station includes at least one unicast streaming server, at least one multicast streaming server, and a digital content storage unit, wherein the digital content storage unit provides a plurality of digital contents to be displayed for consumers connected to the central broadcasting station via a transmission media. The audit trails unit receives and records the individual expenditure information of consumers. The distributing control unit controls the distribution of the digital contents in accordance with the individual expenditure information of consumers, wherein when consumers watch one identical digital content, the distributing control unit will determine to distribute the identical digital content to the consumers by the at least one unicast streaming server or the at least one multicast streaming server.

12 Claims, 3 Drawing Sheets

| domain name | dictionary | disk code | video code name | file name | file extension name |
|---|---|---|---|---|---|
| http://localhost/ | mv1 | C | 215 | x+1 | .rm |
| http://localhost/ | mv2 | D | 216 | x+2 | .mov |
| http://localhost/ | mv3 | E | 217 | x+3 | .wma |
| http://localhost/ | mv4 | F | 218 | x+4 | .rm |
| http://localhost/ | mv5 | G | 219 | x+5 | .mov |

Fig. 3

SYSTEM FOR A DIGITAL CONTENT DISTRIBUTING SERVICE AND THE METHOD THEREOF

FIELD OF THE INVENTION

This invention pertains generally to a system for a digital content distributing service and the method thereof, and more particularly, to a system and method for distributing one identical digital content to consumers wherein a distributing control unit determines the distribution of the digital contents to be transmitted by a unicast streaming server or a multicast streaming server in accordance with the individual expenditure information of the consumers.

BACKGROUND OF THE INVENTION

In recent years, along with the explosive growth and development of the network and the techniques of exchanging packets of data, they make the appliance of internet grows faster, easier and more diverse, and facilitate massive amounts of abundant information could be available to users connected the network.

Given the benefits of fast internet resource, transmitting or watching various digital content over a network has become commonplace in today's entertainment-oriented society, such as the example that displaying a variety of video, audio, or literary works online. While the transmission of non-material multimedia digital contents to consumers via the Internet makes people receive various information more conveniently, it also can lead to a lower trash production. Accordingly, websites providing multimedia content for watching online must be the importance of the trend on the future.

Heretofore, multimedia files are mostly distributed by downloading files from the Internet, saving the multimedia files in the folder "temporary internet files" until fully downloaded, and displaying the multimedia files with a compatible media player application. However, that is an inherently questionable process due to the easily reproducing ability of those files, and the process also cause tremendous crisis and harm to the intellectual property of copyright owners.

Accordingly, online video/audio websites utilizing streaming technique to distribute various multimedia files are developed, allowing a multimedia file to be displayed to a end-user in a short time without finishing the download. In general, online video/audio websites distributes huge multimedia data to end-users by an unicasting streaming mode or a multicast streaming mode. One advantage of the unicasting streaming mode is to serve many different streams as each client demands different multimedia file or the same multimedia file at different times. Besides, unicasting streaming allows consumers conveniently to pause, rewind, fast forward, or re-start the multimedia file once it has started. However, the distribution of the multimedia file to numerous by the unicasting streaming mode occupies a large amounts of transmission bandwidth. Multicasting streaming mode can provide efficient delivery of content to many concurrent users, and result in significantly more efficient use of overall bandwidth resources since multiple copies of the same multimedia file between any sender/receiver pair are avoided. Further, Multicasting streaming mode shares the same stream among all users on the network, thereby conserving enormous amounts of bandwidth leading directly to huge cost savings, making it ideal for online video/audio websites.

Although multicasting streaming mode can significantly reduce the bandwidth traffic loads, however, consumers are restrained to receive only the pre-scheduled set of multimedia files at the times selected by the website operator. In addition, consumers are also restrained to control the displaying of multimedia files such as pause, rewind, and the like.

The method of streaming media can only transmit the data flow of multimedia, and leave no temporary data in the end-user, so as to protect the rights of intellectual property right owners. However, online video/audio websites generally cannot afford heavy loading of bandwidth usage by clients due to the limitation of physical bandwidth of the websites. Thus, the bandwidth limitation problems to the servers has make the development of online video/audio websites in the multimedia industry to a difficult position all along. Moreover, when consumers watch one identical multimedia file again, generally the consumers have to pay for the same multimedia file again. In this manner, the act of pay-per-view is seldom inconsistent with equitable principles of trade, which also leading to the shortage of consumers' interest for visiting the websites.

On the other hand, with such a surge in Internet usage, it should come as no surprise that its impact on society has been heavy. For example, once internet users capture the downloaded URL pointing to those multimedia files by checking the address bar of the browser or looking up the playing information stored in the media application, they may easily download and copy the multimedia files without authorization. In this situation, the Internet has become the media of providing and distributing illegal copy of digital contents, and also caused huge loss to the industries.

In order to efficiently protect the rights of copyright owners and solve the infringement problem in the Internet, protection systems are used in website servers to restrict download of distributed content, for example, using No-Right-Click Scripting program for blocking source code from gathering, or using a PHP application that requires users to register before downloading binary files, or frequently specifying a different location for the download directory.

However, the protection systems described above is not directly developed for websites who distributes digital contents online. Moreover, the safety of the website can not be guaranteed when the numerous amount and size of digital contents stored in a server are simply only protected by producing a plurality of virtual address paths to avoid unauthorized access.

Therefore, there is a need for an improved method and system for a digital content distributing service to overcome the shortcomings of the prior art.

SUMMARY OF THE INVENTION

It is an object of the present invention to provide a system and method for distributing digital content service wherein a multicast streaming distributing mode is applied to allow consumers to watch one identical digital content for free or with a payment reduction next time.

Another object of the present invention is to provide a system and method for distributing digital content service wherein the central broadcasting station can control the bandwidth consumption by an unicast streaming server and a multicast streaming server to distributing multiple digital content at the same time.

Another object of the present invention is to provide a system and method for distributing digital content service wherein when the consumers repetitively watch one identical digital content, a multicast streaming server is used for distributing the identical digital content to enhance the consumers rights as watching over the internet and prevent the bandwidth of websites from being over occupied, to increase the efficiency and practicability of the central broadcasting station.

Another object of the present invention is to provide a system and method for distributing digital content service wherein a remote distributing unit loads a media player window on a computer device of the consumer. The media player window has no information with respect to the address path of digital content to be displayed, and thereby avoid the digital content to be downloaded from the address path by the consumers.

Another object of the present invention is to provide a system and method for distributing digital content service wherein an access-address control unit immediately produces an address information when receiving a request for transmitting digital content, to prevent the configuration of designating address information from probing and cracking by interne intruders.

Still another object of the present invention is to provide a system and method for distributing digital content service for attracting relish and attention of consumers by the advantage of allowing consumers to repetitively watch one identical digital content for free or with a payment reduction, and also converting the custom of purchasing conventionally material video/audio product to achieve a non-pollution marketing mode.

In order to attain the above-described objects, a system for distributing digital content service in accordance with the present invention comprises a central broadcasting station, an audit trails unit and a distributing control unit. The central broadcasting station includes at least one unicast streaming server, at least one multicast streaming server, and a digital content storage unit for consumers to connect and watch digital contents via a transmission media. The audit trails unit is used for receiving and recording individual expenditure information of the consumers. The distributing control unit is used for controlling the distribution of the digital contents in accordance with the individual expenditure information of the consumers.

In use, the audit trails unit receives and records individual expenditure information of the consumers after a consumer requests the central broadcast station to transmit one chosen digital content. Next, the distributing control unit determines to distribute the chosen digital content to the consumer by the at least one unicast streaming server or the at least one multicast streaming server. Further, when the consumer repetitively watch the identical digital content, the distributing control unit, according to the individual expenditure information of the consumers, will determine to distribute the identical digital content to the consumer by the at least one unicast streaming server or the at least one multicast streaming server.

A remote distributing unit loads a media player window on the computer device of the consumer, wherein the media player window has no information with respect to the address path of digital content to be displayed, thereby protects the digital content from an unauthorized downloaded.

Further, when the consumer repetitively watch one identical digital content, an access-address control unit produces multiple virtual address information for providing to the remote distributing unit, such that the remote distributing unit captures different virtual address information whenever executing and displaying the identical digital content, and thereby preventing the address path of the digital content to prevent the full address information of digital contents from cracking and downloaded.

Other objects, advantages and novel features of this invention will become more apparent from the following detailed description when taken in conjunction with the accompanying drawings.

BRIEF DESCRIPTION OF THE DRAWINGS

FIG. 3 illustrates the generation of multiple virtual address information of a digital content in accordance with the invention.

DETAILED DESCRIPTION OF THE PREFERRED EMBODIMENT

Figure 1:
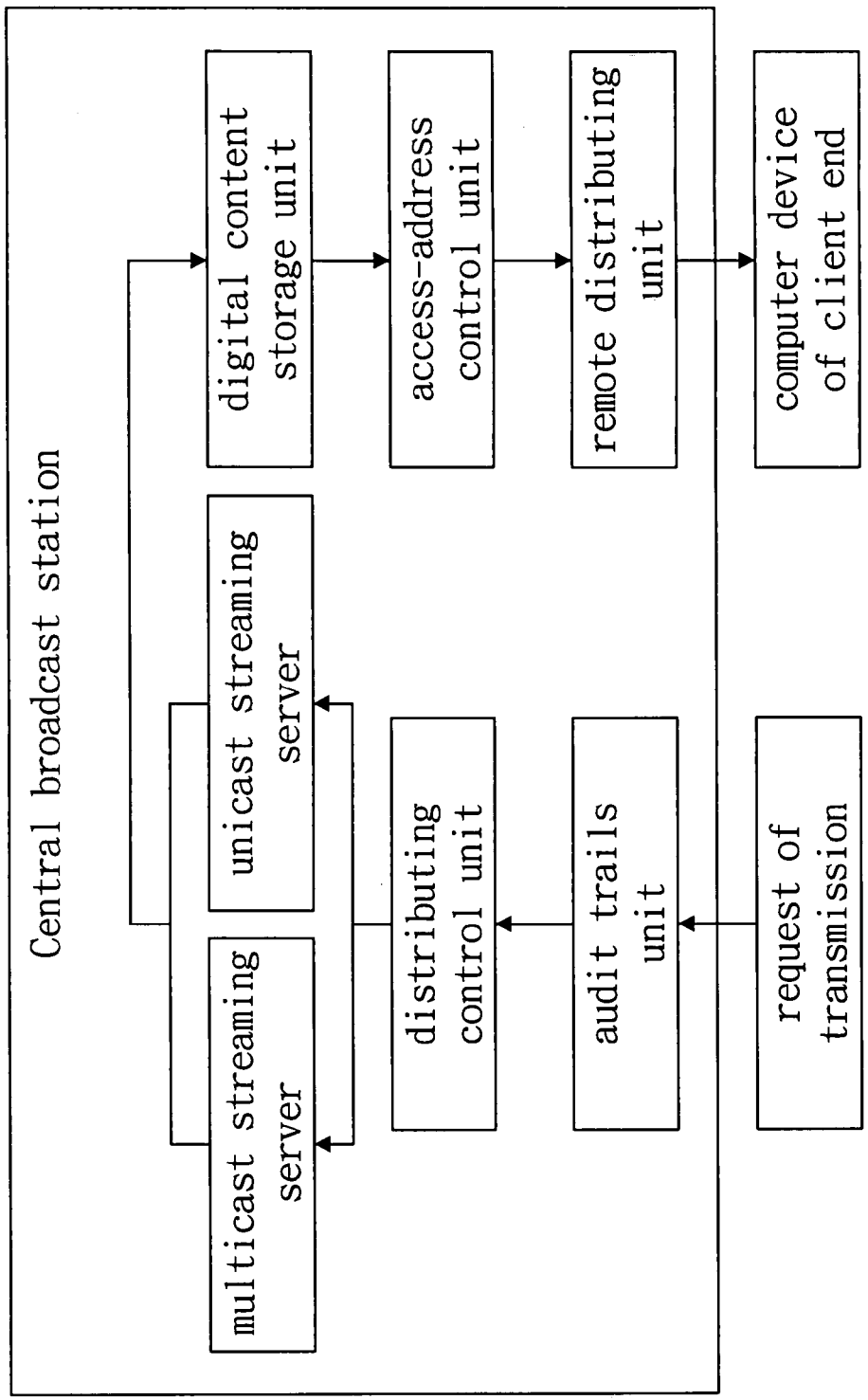
FIG. 1 is a block diagram showing a distributing system according to an embodiment of the present invention.

Referring to FIG. 1, a system for distributing digital content service according to an embodiment of the present invention is shown wherein the system includes a central broadcasting station, an audit trails unit, and a distributing control unit.

The central broadcasting station includes at least one unicast streaming server, at least one multicast streaming server, a digital content storage unit, a remote distributing unit, and an access-address control unit.

The digital content storage unit stores a plurality of multimedia digital contents (e.g., music, movie, graphic, literary work, and the like) to be displayed for consumers connected to the central broadcasting station via a transmission media (e.g., a local area network (LAN) or an Internet), wherein the consumers will able to actually watch the view or listen to the multimedia digital contents online. The audit trails unit is used for receiving and recording individual expenditure information of the consumers, and the distributing control unit is used for controlling the distribution of the digital contents in accordance with the individual expenditure information of the consumers.

Further, the central broadcasting station provides a website with a membership payment mechanism, and an individual expenditure information is immediately constructed after the consumers joining the membership. After registration, the consumers are allowed to purchase digital contents to be displayed and pay for the private displaying of that digital contents to their computers online.

When one consumer requests to watch one chosen digital content for the first time, the audit trails unit will record the pay-per-view to the individual expenditure information of the consumer. Then, the remote distributing unit loads a media player window on a computer device of the consumer designed for receiving and displaying the chosen digital content from the at least one unicast streaming server or at least one multicast streaming server.

Once the consumer requests to watch the chosen digital content immediately, the distributing control unit will determine to distribute the chosen digital content to the consumer from the at least one unicast streaming server. In this manner, it allows the consumer to watch chosen digital contents at any time, and it is preferably that the consumer is required to pay a rate of higher price for watching in real time. Oppositely, if the consumer watch the chosen digital content at the times scheduled by the central broadcast station, the central broadcast station will determine to distribute the chosen digital content from the at least one multicast streaming server, and in this manner, allowing the consumer to watch the chosen digital content with a payment reduction.

Moreover, once the consumers repetitively watch one identical digital content, the audit trails unit will validate the individual expenditure information of the consumer against the identical digital content. This validation is operative to help the distributing control unit determine to distribute the identical digital content to the consumers by the at least one unicast streaming server or the at least one multicast streaming server according to the individual expenditure information of the consumers.

Further, when the consumers repetitively watch one identical digital content, the distributing control unit can also determine the rate of price according to the individual expenditure information of the consumers.

Preferably, the consumer is allowed to watch the identical digital content with a payment reduction when the consumer requests to watch the chosen digital content immediately again, and in this manner, the distributing control unit distributes the identical digital content by the at least one multicast streaming server.

Preferably, the consumer is allowed to repetitively watch the identical digital content for free at the times scheduled by the central broadcast station, and in this manner, the distributing control unit distributes the identical digital content by the at least one multicast streaming server.

Still further, while the consumer requests transmitting of a chosen digital content, the central broadcast station concurrently validate an usage rights information of the chosen digital contents before distributing to the consumer, wherein the usage rights information limit the authority and number of times for displaying the chosen digital content or an expiration date, so as to decide whether the distributing is authorized.

Figure 2:
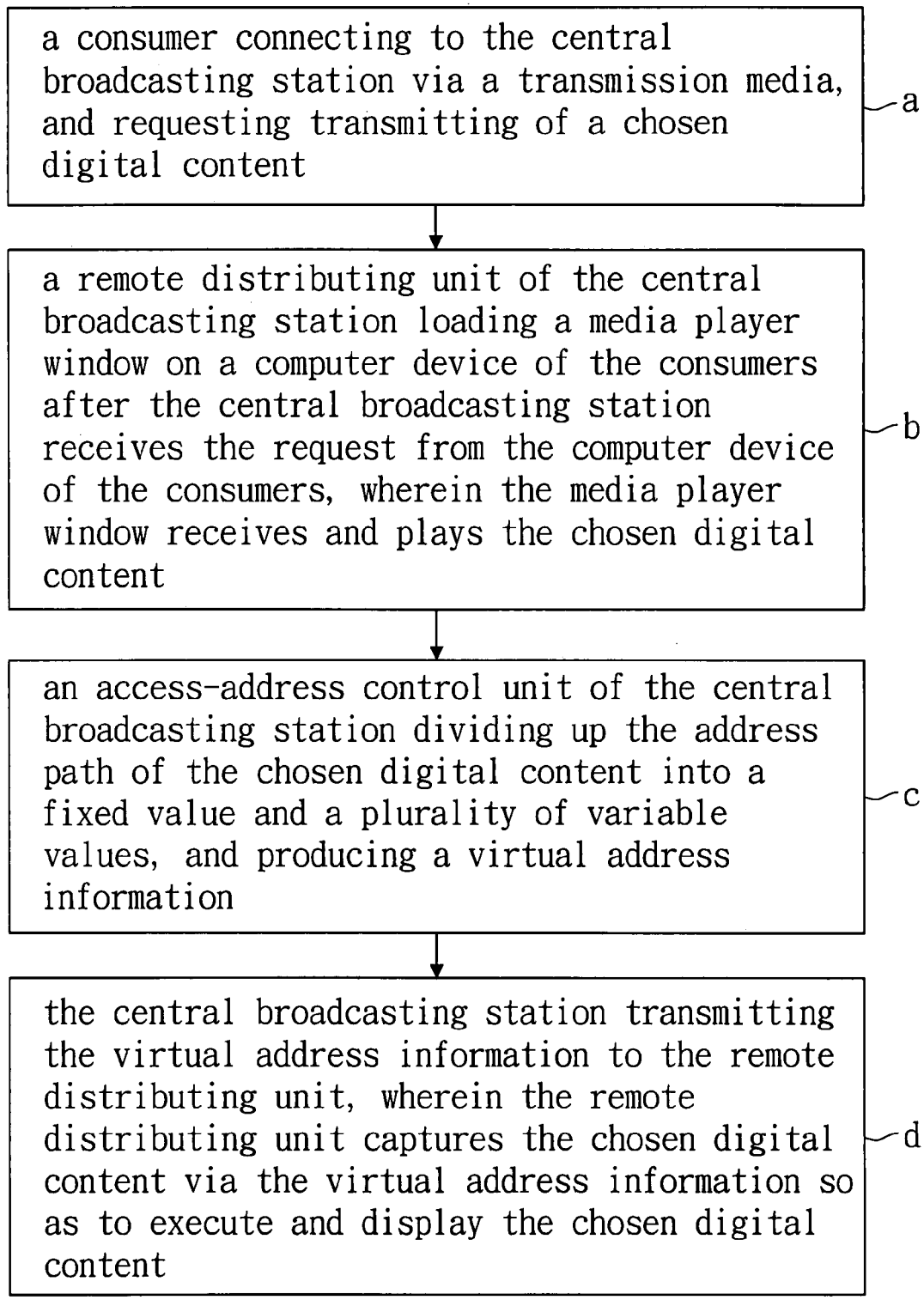
FIG. 2 is a flow chart according to an embodiment of the present invention for explaining the distribution of the address information of a digital content information between a server and a client in accordance with the invention.

Referring to FIG. 2, a method for distributing digital content service according to an embodiment of the present invention is shown wherein the system further comprises an access-address control unit. The access-address control unit divides up the address path of one chosen digital content into a fixed value and a plurality of variable values. As used herein, the fixed value preferably includes the domain name of the address path pointing to the chosen digital content, and the plurality of variable values preferably include the address path except domain name. Thus, the access-address control unit can produce a plurality of virtual address information for the central broadcasting station to provide the virtual address information to the remote distributing unit, so as to execute and display the chosen digital content.

In another embodiment the method further include following steps of:
(a) a consumer connecting to the central broadcasting station via a transmission media, and requesting transmitting of a chosen digital content;
(b) a remote distributing unit of the central broadcasting station loading a media player window on a computer device of the consumers after the central broadcasting station receives the request from the computer device of the consumers, wherein the media player window receives and plays the chosen digital content;
(c) an access-address control unit of the central broadcasting station dividing up the address path of the chosen digital content into a fixed value and a plurality of variable values, and producing a virtual address information; and
(d) the central broadcasting station transmitting the virtual address information to the remote distributing unit, wherein the remote distributing unit captures the chosen digital content via the virtual address information so as to execute and display the chosen digital content.

As mentioned above, while the consumer connects to the central broadcasting station via a local area network (LAN) or an Internet for requesting transmitting of a chosen digital content, the remote distributing unit loads a media player window on the computer device of the consumer for receiving and displaying the chosen digital content.

Preferably, the media player window is an interactive media player window with a control panel, allowing the consumer to send different control command (e.g., pause, rewind, fast forward, and the like) against the displaying of the chosen digital content.

In addition, the media player window includes no any virtual address information of the chosen digital content, and the media player window is controlled by the access-address control unit such that the consumer is unable to capture the virtual address information of the chosen digital content even though communication between the central broadcast station and the computer of the consumer make makes use of standard protocols such as HTTP (The Hypertext Transfer Protocol).

In practice, the access-address control unit produces a dynamic virtual address information by rewriting the name of the variable values, to prevent the physical address path from being exposed. For instance, during the processing of producing a dynamic virtual address information, the access-address control unit divides up the address path of the chosen digital content stored in the digital content storage unit into a fixed value and a plurality of variable values, and produces a first address information according to the collocation of the fixed value and the variable values. Next, the central broadcast station transmits the first address information to the remote distributing unit and executes the displaying of the chosen digital content.

Further, due to the media player window includes no any virtual address information of the chosen digital content, the consumer is unable to capture any address information to access without authorization.

In accordance with one embodiment of the present invention, the character of the access-address control unit is described. The address path structure of the digital content consists of five dictionaries, wherein the path to the digital content is "http://domain name/dictionary/disk code/video code name/file name.file extension name", and wherein the "video code name" is the variable values in the step (c) described above, and wherein the remaining address path is the fixed value in the step (c) described above.

Preferably, the access-address control unit sets up the "video code name" of the address path with five variable values, meanwhile, the digital content storage unit copies the chosen digital content into five equivalent files by the amount equals the amount of the variable values, to thereby provide each copied file with one corresponding virtual address information.

In practice, the access-address control unit produces a first address information, and the full path name of the first address information is "http://localhost/mv1/C/215/x+1.rm", for the central broadcast station to transmit the first address information to the remote distributing unit. Then, when the consumer requests to transmit the identical digital content in the next time, the access-address control unit will sequentially produce a second address information with a full path name "http://localhost/mv1/C/215/x+2.rm", for the central broadcast station to transmit the second address information to the remote control unit. When the identical digital content is requested to transmit more than five times, the central broadcast station will repeat transmission of the first address information (http://localhost/mv1/C/215/x+1.rm).

Thus, when the consumers repetitively requests for transmission of one identical digital content, the access-address control unit will sequentially produce a third, fourth, and fifth address information, and in this manner, the remote control unit will obtain different address information to every requesting for the same digital content from the consumers. Accordingly, the present invention prevent the file naming rules from cracking even though hackers aggregate information on a plurality of virtual address information.

It should be noted that although the present invention has been described with reference to specific embodiments, other embodiments may occur to those skilled in the art without deviating from the intended scope. For example, the actual copied amount of the chosen digital content is variable. For example, every dictionary except the domain name in the address path may be organized as a plurality of variable values, for the plurality of address information sequentially produced by the access-address control unit to accomplish loading sharing and data security. According to the above configuration, the central broadcast station can prevent digital contents from being downloaded while distributing online, to protect the rights of copyright owners of the distributed digital contents.

From the foregoing, it is apparent that the present invention is advantageous in that:
1. The foregoing invention has successfully tied together at least one unicast streaming server and at least one multicast streaming server in a central broadcast station, allowing consumers to repetitively watch an identical digital content for free or with a payment reduction. Thus, the present invention can attract relish and attention of consumers and optimize the central broadcast station by efficiently controlling the bandwidth usage.
2. According to the present invention, consumers are unable to see or capture the address information of digital content by a distribution of multimedia digital contents with the protection of that content using a specific media player window. Therefore, any unauthorized access is avoidable and network infringement may be restrained.
3. According to the present invention, the access-address control unit divides up the address path of digital contents into a fixed value and a plurality of variable values, and produces multiple address information according to the collocation of the fixed value and the variable values. In this manner, hackers are unable to easily figure out the physical address path and file naming rules of the address information, and thus protect the copyrighted content via the Internet.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A system for distributing digital content service including a central broadcasting station, comprising:
   at least one unicast streaming server;
   at least one multicast streaming server;
   a digital content storage unit, wherein the digital content storage unit provides multiple digital contents to be displayed for consumers connected to the central broadcasting station via a transmission media;
   a remote distributing unit for loading a media player window on a computer device of the consumers;
   an access-address control unit for dividing up the address path of one chosen digital content into a fixed value and multiple variable values, and producing multiple virtual address information for the central broadcasting station to provide the virtual address information to the remote distributing unit so as to execute and display the chosen digital content;
   an audit trails unit for receiving and recording individual expenditure information of the consumers; and
   a distributing control unit for controlling the distribution of the digital contents in accordance with the individual expenditure information of the consumers;
   wherein when the consumers repetitively watch one identical digital content, the distributing control unit will determine to distribute the identical digital content to the consumers by the at least one unicast streaming server or the at least one multicast streaming server.

2. The system of claim 1, wherein the transmission media includes a local area network (LAN) or an Internet.

3. The system of claim 1, wherein the central broadcasting station further comprises a website with a membership payment mechanism.

4. The system of claim 1, wherein the digital contents are digital video and audio multimedia files.

5. A method for distributing digital content service, comprising:
   providing multiple digital contents available in a central broadcasting station for consumers to watch online;
   the consumer connecting to the central broadcasting station via the transmission media,
   and requesting transmitting of the chosen digital content;
   receiving and recording individual expenditure information of the consumers by an audit trails unit after the consumers request the displaying of one chosen digital content;
   determining to distribute the chosen digital content to the consumers by the at least one unicast streaming server or the at least one multicast streaming server after the audit trails unit finishes recording the individual expenditure information of the consumers;
   a remote distributing unit of the central broadcasting station loading a media player window on a computer device of the consumers after the central broadcasting station receives the request from the computer device of the consumers, wherein the media player window receives and plays the chosen digital content;
   an access-address control unit of the central broadcasting station dividing up the address path of the chosen digital content into a fixed value and multiple variable values, and producing a virtual address information;
   the central broadcasting station transmitting the virtual address information to the remote distributing unit, wherein the remote distributing unit captures the chosen digital content via the virtual address information so as to execute and display the chosen digital content; and
   when the consumers repetitively watch one identical digital content, the distributing control unit, according to the individual expenditure information of the consumers, will determine to distribute the identical digital content to the consumers by the at least one unicast streaming server or the at least one multicast streaming server.

6. The method of claim 5, further comprising: the distributing control unit distributing the chosen digital content to the consumers by the at least one multicast streaming server, to allow the consumers to repetitively watch the identical digital content for free or with a payment reduction.

7. The method of claim 5, wherein the transmission media includes a local area network (LAN) or an Internet.

8. The method of claim 5, further comprising: the central broadcasting station copying the chosen digital content into multiple equivalent files by an amount equals the amount of the variable values, to thereby provide each copied file with one corresponding virtual address information.

9. The method of claim 8, further comprising: when the consumers repetitively watch one identical digital content, the access-address control unit producing another different virtual address information for the central broadcasting station to transmit to the remote distributing unit.

10. The method of claim 9, further comprising: checking an usage rights information of the chosen digital contents before distributing to the consumer, so as to decide whether the distributing is authorized.

11. The method of claim 10, wherein the usage rights information limit the authority and number of times for displaying the chosen digital content.

12. The method of claim 10, wherein the digital content is digital video and audio multimedia files.

\* \* \* \* \*